United States Patent
Park et al.

(10) Patent No.: US 10,250,654 B2
(45) Date of Patent: *Apr. 2, 2019

(54) METHOD AND APPARATUS FOR TRANSCEIVING DATA PACKET FOR TRANSMITTING AND RECEIVING MULTIMEDIA DATA

(71) Applicant: Samsung Electronics Co., Ltd., Suwon-si, Gyeonggi-do (KR)

(72) Inventors: Kyung-Mo Park, Seoul (KR); Sung-Ryeul Rhyu, Yongin-si (KR); Sung-Oh Hwang, Yongin-si (KR); Jae-Yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/681,748

(22) Filed: Aug. 21, 2017

(65) Prior Publication Data

US 2017/0346868 A1 Nov. 30, 2017

Related U.S. Application Data

(63) Continuation of application No. 14/051,863, filed on Oct. 11, 2013, now Pat. No. 9,742,826.

(30) Foreign Application Priority Data

Oct. 12, 2012 (KR) .................. 10-2012-0113543

(51) Int. Cl.
*G06F 15/16* (2006.01)
*H04L 29/06* (2006.01)
*H04N 21/236* (2011.01)

(52) U.S. Cl.
CPC ............ *H04L 65/60* (2013.01); *H04L 65/607* (2013.01); *H04N 21/236* (2013.01)

(58) Field of Classification Search
CPC ...... H04L 65/60; H04L 65/607; H04N 21/236
USPC ............................................................ 709/219
See application file for complete search history.

(56) References Cited

U.S. PATENT DOCUMENTS

| | | | |
|---|---|---|---|
| 2005/0002525 A1 | 1/2005 | Alkove et al. | |
| 2005/0105555 A1* | 5/2005 | Oshima | 370/469 |
| 2005/0198531 A1* | 9/2005 | Kaniz et al. | 713/201 |
| 2007/0189286 A1 | 8/2007 | Park et al. | |
| 2008/0123620 A1* | 5/2008 | Ko et al. | 370/349 |
| 2009/0116490 A1 | 5/2009 | Charpentier et al. | |
| 2010/0265967 A1* | 10/2010 | Lim et al. | 370/474 |
| 2011/0208829 A1* | 8/2011 | Kwon et al. | 709/217 |
| 2011/0255558 A1 | 10/2011 | Hwang et al. | |
| 2012/0120819 A1 | 5/2012 | Regev | |

(Continued)

FOREIGN PATENT DOCUMENTS

KR 20120084275 A 7/2012

*Primary Examiner* — Tauqir Hussain
(74) *Attorney, Agent, or Firm* — Jefferson IP Law, LLP

(57) ABSTRACT

A method for transmitting complex multimedia data is provided. The method includes selecting one of a data headers composed of basic transmission units determined according to an amount of multimedia included in the complex multimedia data, generating a basic transmission unit of the complex multimedia data according to the selected data header, packetizing the complex multimedia data in the basic transmission unit; and transmitting the packetized complex multimedia data to a receiver.

3 Claims, 1 Drawing Sheet

(56) References Cited

U.S. PATENT DOCUMENTS

| | | |
|---|---|---|
| 2012/0131626 A1 | 5/2012 | Fernandez Gutierrez |
| 2012/0185907 A1 | 7/2012 | Park et al. |
| 2012/0206650 A1 | 8/2012 | Lin |
| 2012/0218942 A1* | 8/2012 | Lu et al. .................. 370/328 |
| 2013/0297817 A1 | 11/2013 | Bae et al. |
| 2014/0133489 A1 | 5/2014 | Bae |

* cited by examiner

METHOD AND APPARATUS FOR TRANSCEIVING DATA PACKET FOR TRANSMITTING AND RECEIVING MULTIMEDIA DATA

CROSS-REFERENCE TO RELATED APPLICATION(S)

This application is a continuation application of prior application Ser. No. 14/051,863, filed on Oct. 11, 2013, which has issued as U.S. Pat. No. 9,742,826 on Aug. 22, 2017 and claimed the benefit under 35 U.S.C. § 119(a) of a Korean patent application filed on Oct. 12, 2012 in the Korean Intellectual Property Office and assigned Serial No. 10-2012-0113543, the entire disclosure of which is hereby incorporated by reference.

TECHNICAL FIELD

The present disclosure relates to a method and apparatus for generating a data packet for transmitting and receiving complex multimedia data in a multimedia system.

BACKGROUND

In recent multimedia services, MPEG Media Transport (MMT) is being considered for a hybrid network, in which a broadcast network and a communication network are simultaneously connected, and complex multimedia data, in which multimedia data, applications, and files are provided together.

MMT is a multimedia transport standard based on Moving Picture Experts Group (MPEG). MMT may be used for broadcast and multimedia services such as multi-functional smart TV, multi-view TV, N-screen, and the like, instead of using MPEG-2 Transport Stream (TS), and provide efficient MPEG transport in multimedia service environments varied based on an Internet Protocol (IP).

In addition, due to the increasing consumption of multimedia data and technological development, the foregoing complex multimedia data containing various kinds of multimedia content, such as multimedia data, applications, and files, have been introduced.

The complex multimedia data contain various kinds of multimedia content ('complex multimedia content'). At the time of transmission of the complex multimedia data, the complex multimedia data are fragmented or aggregated for respective content, which are then transmitted through an integrated transmission network.

For example, complex multimedia data containing applications for video, audio, and widgets are organized into data packets in consideration of characteristics, such as a video signal transmission method, an audio signal transmission method, and a file transmission method, and then transmitted. The transmitted data packets are reorganized to the complex multimedia data at the receiving terminal.

However, when complex multimedia data are transmitted in the current hybrid network environment, efficient services suitable for the hybrid network environment are difficult to provide.

Therefore, in order to provide efficient services suitable for the hybrid network environment, the configuration of complex multimedia data packets according to multimedia data characteristics requires a corresponding multimedia content to be composed and decomposed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for transceiving a data packet for transmitting and receiving complex multimedia data in a multimedia system.

Another aspect of the present disclosure is to provide a method and an apparatus for configuring a data packet by defining structures of a MPEG Media Transport (MMT) packet header and an MMT payload and the use of fragmentation and aggregation of an MMT packet.

In accordance with an aspect of the present disclosure, a method for transmitting complex multimedia data is provided. The method includes selecting one of data headers composed of basic transmission units determined according to an amount of multimedia included in the complex multimedia data, generating a basic transmission unit of the complex multimedia data according to the selected data header, packetizing the complex multimedia data in the basic transmission unit, and transmitting the packetized complex multimedia data to a receiver.

In accordance with another aspect of the present disclosure, an apparatus for transmitting complex multimedia data is provided. The apparatus includes a controller configured to select a data headers composed of basic transmission units determined according to an amount of multimedia included in the complex multimedia data, a data packet generator configured to generate a basic transmission unit of the complex multimedia data according to the selected data header, and a transmitter configured to packetize the complex multimedia data in the basic transmission unit on the instruction of the controller and to transmit the packetized complex multimedia data to a receiver.

In accordance with another aspect of the present disclosure, a method for receiving complex multimedia data is provided. The method includes receiving a basic transmission unit generated by a data headers composed of basic transmission unit determined according to the number of multimedia organizing the complex multimedia data, confirming a header of the basic transmission unit, and receiving the complex multimedia data packetized in the basic transmission unit according to the confirmed header.

In accordance with another aspect of the present disclosure, an apparatus for receiving complex multimedia data is provided. The apparatus includes a receiver configured to receive a basic transmission unit generated by data headers composed of basic transmission unit determined according to the number of multimedia organizing the complex multimedia data, a header detector configured to confirm a data header of the received the basic transmission unit, and a controller configured to control the receiver to receive the complex multimedia data packetized in the basic transmission unit according to the confirmed header.

In accordance with another aspect of the present disclosure, in order to configure a data packet for transmitting complex multimedia data, a concrete structure of the data packet is generated according to the complex multimedia content, and the data packet is transmitted and received, so that efficient services suitable for a hybrid network environment can be provided at the time of transmission of the complex multimedia data.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
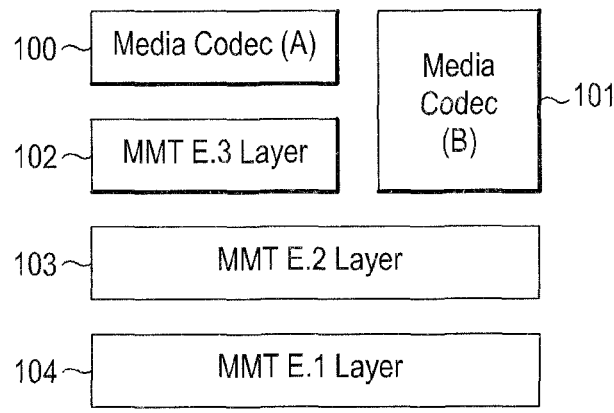
FIG. 1 illustrates an example of an E layer processing complex multimedia data for transmission according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Concerning the designations of reference numerals, the same reference numerals are used throughout the different drawings to designate the same or similar components. Also, when it is considered that detailed descriptions of related known functions or constitutions may obscure the gist of the present disclosure, such detailed descriptions are omitted. Terms described later are defined in consideration of the functions of the present disclosure, but may vary according to the intention or convention of a user or operator. Accordingly, the definition will be made based on the overall contents of this specification.

Hereinafter, various embodiments of the present disclosure will be described based on Motion Picture Experts Group Media Transport (MPEG Media Transport, hereinafter, referred to as 'MMT'), which is one technology to which the present disclosure is applicable. However, it should be noted that this embodiment is illustrated only for convenience of explanation and the present disclosure does not be applied to only MMT.

The fundamental concept of the present disclosure will be briefly presented.

A hybrid network environment in the present disclosure refers to an environment having a connection structure between a server and a client where a dedicated network for broadcasting (hereinafter, referred to as 'broadcast network') and a network for Internet communication (hereinafter, referred to as 'broadband network') may be simultaneously provided to the same client and the client may receive services through a plurality of networks. A plurality of network environments may be configured by connecting the broadcast network and the broadband network, or by including a wired or wireless network.

Hereinafter, various embodiments of the present disclosure will be described in detail with reference to the accompanying drawings.

FIG. 1 illustrates an example of an E layer processing complex media contents in MPEG MMT according to an embodiment of the present disclosure.

Referring to FIG. 1, an E layer includes three sub-layers. The three sub-layers correspond to a multimedia codec (A) 100, a multimedia codec (B) 101, and an MMT E.3 layer 102. The multimedia codec (A) 100 and the multimedia codec (B) 101 have functional differences.

For example, an output of an H. 264 codec corresponds to a Network Adaptation Layer (NAL) unit for providing multimedia characteristic information, signaling information for decoding, and the like, together with compressed digital video multimedia data. In another example, an output of an H. 262 codec output is applied to only the compressed digital video multimedia data. The H. 264 codec may be used as the multimedia codec (B) 101, and the H. 262 codec may be used as the multimedia codec (A) 100. However, in some cases, the H. 264 codec may be also the multimedia codec (A) 100. In this case, the output of the H. 264 codec may further include information generated in the MMT E. 3 layer 102.

The MMT E.3 layer 102 generates a Media Fragment Unit (MFU) by inputting various kinds of multimedia as sources. The MFU has a function similar to that of the above-described NAL unit, and includes information on priority and dependency counter in the range of a data transmission unit, which may be used to configure a transport packet. However, the MFU is different from the NAL unit in that the MFU can have all kinds of multimedia sources, such as a video signal, an audio signal, a text signal, an application, and a web page, in a payload. Functions of the MMT E.3 layer 102 are described below with reference to FIGS. 2 and 3.

The MMT E.2 layer 103 aggregates various kinds of MFUs transferred from a single multimedia source to configure a Media Processing Unit (MPU). The MMT E.2 layer 103 generates an MMT asset in which the MPUs are configured as one stream. Last, the MMT E.1 layer 104 configures an MMT package, which can be serviced to a user, by using several MMT assets.

The transmitting apparatus of the present disclosure performs packetization in which the foregoing MPUs and MFUs are configured as a basic transmission unit for transmission of complex multimedia data, and then transmits the packetized data to the receiving apparatus. The MPU is configured by MFUs, each of which is a minimum consumable unit. When the MPU can be independently configured, the MPU is configured such that the MPU can be consumed by and transmitted to a user in the type of bundles in units of spatial section. In addition, the MFUs may be variably configured in one MPU according to the transmission environment, considering transmission efficiency.

Hereinafter, a 'packet header configuring step' for packet configuration and a 'packet payload configuring step' for packet payload configuration, which are included in a step for transmitting complex multimedia data in the transmitting apparatus of the present disclosure, will be separately described.

An MMT payload of an MMT packet may include a payload header region including configuration information used according to the transmission environment and a data region including transmission data. In addition, the MMT payload may be included in an MMT packet operating in Transmission Control Protocol (TCP)/User Datagram Protocol (UDP) environments corresponding to Internet Protocol (IP) based environments or a payload of a Real-time Transport Protocol (RTP), which is an IP, and then transmitted to a terminal.

In an embodiment of the present disclosure, for example, the header region of the MMT payload, which may be universally configured for transmission of complex multimedia data in a hybrid network environment, may be configured as shown in Table 1.

TABLE 1

| Bit Offset | 0-7 | 8-15 | 16-23 | 24-31 |
|---|---|---|---|---|
| 0 | Length | | Type | FI (2), Flags |
| 32 | Data Offset/ reserved | | Fragmentation Information | |
| 64 | Aggregation Information | | | |
| 96 | Options (Optional) | | | |
| 128 | Data | | | |

Respective fields included in Table 1 are explained as follows.

1) Length Field:

The length field indicates a length of the payload (Data), and is expressed in a total of 16 bits. The size of data padded after packetization is calculated through the length field, so that data necessary for actual calculation may be separately processed. In addition, when Forward Error Correction (FEC) is applied, the position of predetermined-sized FEC Identifier (ID) information for FEC decoding may be calculated.

2) Type Field:

The type field indicates a type of the payload (i.e., a data type of the corresponding payload), and may be delivered together with an MMT delivery unit. The type field is expressed in 8 bits, and, for example, indicates data types as shown in Table 2 below.

TABLE 2

| Type | Data configuration type information |
|---|---|
| MFU | It indicates that data of payload can configure MFU. |
| MPU | It indicates that data of payload can configure MFU. |
| Signaling message | It indicates that data of payload can configure signaling message. |
| Parity data | It indicates that data of payload can organize data necessary for processing parity data of FEC or Automatic ReQuest retransmission (ARQ) data. |
| User defined data | It indicates that data of payload can organize other types of data. |

3) Fragmentation Indicator (FI) Field:

The FI field is expressed in 2 bits. When transmitted data of the same type is fragmented into partial data fragments having a basic unit size, complete data of the basic unit can be configured through the corresponding information. The FI field indicates that, of the partial data fragments obtained by fragmenting data of the same type into basic units, corresponding partial data fragments correspond to a start, a center, and an end of the data. For example, when the data type of the corresponding payload is MPU, the receiving apparatus uses the FI field for the bundle unit of processing the MPU. One complete MPU can be received by obtaining an FI field indicating, of partial data fragments having a basic unit size into which the MPU is fragmented, partial data fragments corresponding to a start, a center, and an end of the data. Accordingly, when the receiving apparatus receives partial data fragments corresponding to a start, a center, and an end of the MPU without data loss, the terminal can configure a complete MPU to proceed with a decoding process. For example, in the case of transmitting a live stream or a non-live stream such as Video on Demand (VoD), the payload for transmission may be configured by a single or a plurality of MFUs or MPUs, which may be also fragmented into partial data fragments corresponding to predetermined ranges of sections through the corresponding field, and then transmitted. In addition, in the case of file transmission, the overall file may be transmitted by being recognized as one MPU, or the overall file may be fragmented into partial files corresponding to predetermined ranges of sections and some of the fragmented files may be transmitted. For achieving this, chained payloads may be indicated through such information, and a function of configuring the payload in units of MFUs or MPUs can be provided through a corresponding information configuration. A plurality of MPUs or MFUs, signaling messages, and parity data, of the same type, can be transmitted in one payload.

4) Flags Field:

The flags field indicates flag switch information representing configuration information of the corresponding payload, and is expressed in 6 bits. For example, in configuring the corresponding payload, the fragmentation flag bit is set to "1" when fragmentation information is transmitted. The receiving apparatus confirms the fragmentation flag bit set to "1" to be accessible to header information of the corresponding payload, which corresponds to the Flags field. The flags field further includes an 'aggregation information flag', a 'random access point flag' and an 'options flag' besides the 'fragmentation flag'. Referring to Table 3 below, the flags commonly indicate that if a flag bit is set to "0", information corresponding to the corresponding flag is absent, and if a flag bit is set to "1", information corresponding to the corresponding flag is set.

TABLE 3

| Flag | Description |
| --- | --- |
| Fragmentation information flag | If the flag bit is set to "1", it indicates that information of the fragmentation information field is set. |
| Aggregation information flag | If the flag bit is set to "1", it indicates that information of the aggregation information field is set. |
| Random access point flag | If the flag bit is set to "1", it indicates that data of the corresponding payload include data used in the random access point. For example, if the signaling message containing service configuration information includes data indicating a start point of operation processing or a start point of independently processable data, the corresponding flag is set. |
| Options flag | If the flag bit is set to "1", it indicates that information of the options field is set. |

5) Data Offset Field:

The data offset field includes information variably showing a value of a start position of actual data of the payload, and is expressed in 8 bits. The receiving apparatus is accessible to the start position of actual data by using a value of the data offset field.

6) Fragmentation Information Field:

The fragmentation information field is configured by numbers. When a transmission unit of data is fragmented into several payloads of the same type and then transmitted, corresponding numbers are used as serial numbers of corresponding fragmented payloads. For example, when the MPU, which is one of the transmission units, is fragmented into five payloads and then transmitted, the fragmentation information field is set to 0-4 for the respective payloads. The receiving apparatus may receive one complete MPU by obtaining the numbers indicated by the fragmentation information field. In addition, the receiving apparatus may use the numbers obtained through the fragmentation information field to determine how many payloads are not yet received. The receiving apparatus may also use the numbers obtained through the fragmentation information field to recognize lost payloads and request a transmitter to retransmit some data corresponding to the lost payloads.

7) Aggregation Information Field:

The aggregation information field indicates that the transmission data included in the corresponding payload is the aggregation of several units of data of the same type. For example, the aggregation information field may indicate a case where plural MPUs configure one payload. In addition, the aggregation information field may be configured by a number and Offset values.

The number represents the number of data of the same type, which are included in one payload, and the offset values represent start positions of respective data. For example, when three independently configurable MPUs are included in one payload, a corresponding number is 3. In addition, the offset values corresponding to additional information represent start points of the respective data included in the payload. The aggregation information field may be assumed to represent offset values for two of three MPUs. The offset value of a first data may be accessed through the data offset value of the payload header, and the offset values of the other two data may be accessed through the offset values of the corresponding information.

8) Options Field:

The options field is configured when the corresponding payload contains additional information. The payload should be efficiently configured in consideration of various transmission environments and services. The options field may be configured to be divided into information applicable to all payloads and information applicable to only particular payloads. In addition, a very small configuration may be generally needed for the particular payloads. The present disclosure may require particular modes defined for particular uses in order to allow a simple payload configuration, except for dedicated receivers.

For example, in addition to a generic mode usable to transmit MMT content, an MMT stream mode and a file delivery mode may be considered. An auxiliary field may also be configured to transmit any data in order to predict the need for transmission of information associated with any additive system in the future. The auxiliary field may include a function providing identifier which may provide a function for a loss control, loss reconstruction encoding information, information for requesting an automatic error loss reconstruction, a minimum memory buffer size provided by a terminal, a temporary memory buffer size used in transmission data, critical transmission data, a maximum loss acceptance rate, a maximum acceptance packet delay time, an average packet delay time, synchronization code information for a network synchronization, and the like.

The MMT payload according to an embodiment of the present disclosure may be transmitted by the MMT packet or the RTP packet, which is an Internet Protocol. The MMT packet has a data packet structure for transmission of the MMT payload, and the corresponding data is packetized, that is, fragmented by using a payload as a base unit, and then transmitted to a network. In addition, the MMT transport packet according an embodiment of the present disclosure may include additional information associated with transmission of the header region. For example, the additional information may include a packet ID, a packet number, a flow ID for providing Quality of Service (QoS), and a timestamp applicable for the transmission time and control information.

Specific examples of the foregoing additional information may be represented as shown in Table 4.

TABLE 4

| Bit Offset | 0-7 | 8-15 | 16-23 | 24-31 |
| --- | --- | --- | --- | --- |
| 0 | Packet_id | | Sequence number | |
| 32 | Sequence Number | | Timestamp | |
| 64 | Timestamp | | Flags/length | Packet Class identifier |
| 96 | QoS Classifier | Flow identifier | Extension header fields | |

1) Packet ID Field:

The packet ID indicates an identifier of the MMT transport packet, which is set to a constant value, and is represented in 16 bits. The packet ID is set as identification values of MPUs and MFUs, which are constituents of the payload, which is the basic transmission unit, an identification value for differentiating the MMT payload from an Asset, which is a higher configuration unit, an identification value for differentiating the MMT payload from MMT signaling, an identification value for identifying FEC parity data, and an identification value for differentiating user defined data. In addition, a packet level of packet multiplexing function may be provided through the corresponding identification function.

2) Sequence Number Field:

The sequence number field indicates a sequence number, which is a unique identification number of the transmitted MMT packet, and is represented in 32 bits. The receiving apparatus may confirm the sequence number to determine whether the corresponding packet is lost, and may perform a packet arrangement function according to the corresponding sequence number. Furthermore, the sequence number in the sequence number field may be sequentially increased by the respective MMT packets or assets, and globally exhibit a unique value in a predetermined range of section in the network session. The sequence number field may indicate a sequence number of the overall MMT packet.

3) Timestamp Field:

The timestamp field is used to confirm the time point of generation of the transport packet. The time value included in the timestamp field is set to a value calculated based on a value set in the Internet network protocol. The receiving apparatus confirms the time value, and then utilizes the time value to calculate the transmission time difference between packets and the packet transmission delay time between the transmitter and the receiver.

4) Flags Field:

The flags field is configured by flag information indicating that there is additional header information of the corresponding packet. The flags information generally indicates that corresponding information is absent when the "0" bit is set, and corresponding information is set when the "1" bit is set. The additional header information includes information such as a 'packet class identifier flag', a 'QoS classifier flag', a 'flow identifier flag', and the like. When the network middle device confirms the information, for example, the network middle device utilizes the information in transport of the packet for providing the QoS service. As another example, the network middle device may utilize the corresponding information in 'report packet discard', 'packet transport scheduling setting', or 'packet reconfiguration information'.

5) Length Field:

The length field indicates a length of the additional header information.

6) Packet Class Identifier Field:

The packet class identifier field is configured by information indicating attributes of the corresponding packet. The information indicating the attributes of the packet is packet information used in unicast, unidirectional, bidirectional, and interactive services. This may indicate whether the packet is real-time or non-real-time data. The information indicating the attributes of the packet includes information on the service type the packet and configuration information on the bit rate of the packet. The service type is divided into real-time, non-real-time, broadcast, video call, and hybrid services, and the bit rate of the packet may be set as shown in Table 5 below.

TABLE 5

| Bits 0-2 | Bit rate |
| --- | --- |
| 111 | Constant Bit Rate (CBR) |
| 110 | Real-Time Variable Bit Rate (rt-VBR) |
| 101 | Non-Real-Time Variable Bit Rate (nrt-VBR) |
| 100 | Available Bit Rate (ABR) |
| 011 | Unspecified Bit Rate (UBR) |

7) QoS Classifier Field:

The QoS Classifier field is configured by information indicating the loss priority and the delay allowance of the corresponding packet. The corresponding information includes 'loss priority' and 'delay allowance'. The 'loss priority' is the priority of the corresponding packet, and indicates the priority of loss within a predetermined range of section. The priority is represented by a number, and the higher number represents the more important packet. In addition, the priority is used to determine the process priority and the packet loss in the packet transport in the middle network device. The 'delay allowance' information is expressed by a level according to a delay range section, and the corresponding information is also utilized for time information for processing in the packet transport in the middle network apparatus.

8) Flow Identifier Field:

The flow identifier field includes a flow label identifying the particular QoS required in each flow needed for each data transmission. The flow label includes, for example, a type of packet, a delay, a throughput, a synchronization parameter, and the like. The flow label may be subdivided according to the type of data transmission. The corresponding flow label may set a corresponding value thereof through exchange of cross-reference data between the transmitter and the receiver, before the service is started. In some cases, the cross reference exchange data may be utilized as setting information of the middle network apparatus.

9) Extension Header Fields:

The extension header field, when a predetermined unit of data is stored and utilized in the middle network device, may contain and provide necessary additional information.

Figure 2:
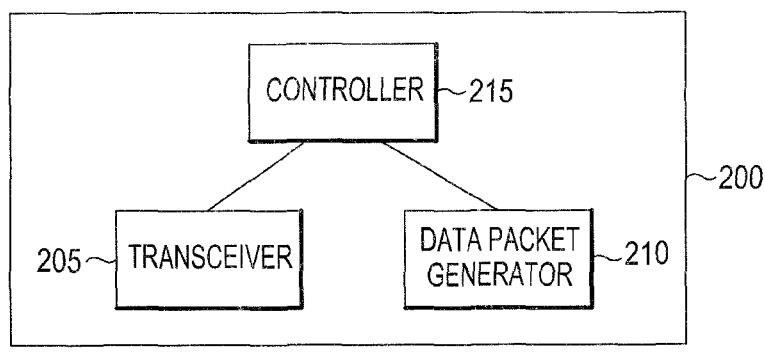
FIG. 2 illustrates an example of an apparatus for transmitting a data packet for transmitting complex multimedia data according to an embodiment of the present disclosure.

FIG. 2 is a schematic diagram showing one example of an apparatus for transmitting a data packet for transmitting complex multimedia data according to an embodiment of the present disclosure.

Referring to FIG. 2, a transmitting apparatus 200 includes a transceiver 205, a data packet generator 210, and a controller 215.

The controller 215 controls the data packet generator 210 to perform packetization in which MPUs and MFUs are configured as a basic transmission unit for transmission of complex multimedia data, and then transmit the corresponding packets to a receiving apparatus. The data packet generator 210 configures the MPU by using MFUs, which are consumable minimum units. In addition, when the MPU can be independently configured, the data packet generator 210 configures the MPU to be consumed by and transmitted to a user in the type of bundles in units of spatial section. The MFUs may also be variably configured in one MPU according to the transmission environment, considering transmission efficiency. The data packet generator 210 may configure an MMT packet payload by a header region configured as shown in Table 1 above, and a data region, during configuring of the MMT packet. Descriptions of detailed components of the respective regions will be omitted due to overlapping with the foregoing descriptions.

The data packet generator 210 selects a predetermined MFU header format according to the amount of multimedia organizing complex multimedia data, and generates an MFU of the complex multimedia data according to the selected header format. The transceiver 205, under the instruction of the controller 215, packetizes the complex multimedia data, and transmits the packetized complex multimedia data to a receiver.

The controller 215 determines whether the amount of multimedia is smaller than a first critical value, and then selects a first MFU header if the amount of multimedia is smaller than the first critical value. The first MFU header may include, for example, a start flag field of a pre-arranged type indicating that the MFU is started, an MFU type field indicating the media type included in the MFU, and a last flag field indicating whether the MFU is a first MFU (start) or a last MFU (end) or the MFU continues (Conti).

The controller 215 determines whether the amount of multimedia satisfying a predetermined standard among the multimedia is not smaller than a second critical value if the amount of multimedia is not smaller than the first critical value. The controller 215 selects a second MFU header if the amount of multimedia satisfying the predetermined standard is smaller than the second critical value. The second MFU header may include, for example, the start flag field, the MFU type field, and the last flag field. The length of the MFU type field of the second MFU header may be assumed to be longer than the length of the MFU type field of the first MFU header.

The controller 215 selects a third MFU header if the amount of multimedia satisfying the predetermined standard is not smaller than the second critical value. The third MFU header may include, for example, the start flag field, the MFU type field, the last flag field, and an MFU type extension field. The MFU type extension field is combined with an MFU type field of the third MFU header to indicate the media type included in the MFU. The last flag field indicates that the MFU type extension field is present.

Figure 3:
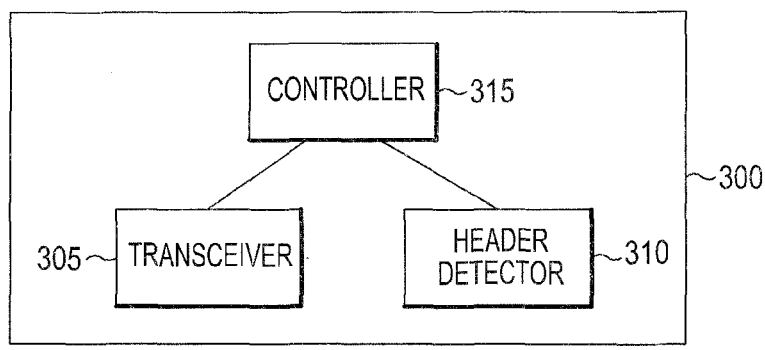
FIG. 3 illustrates an example of an apparatus for receiving a data packet for transmitting complex multimedia data according to an embodiment of the present disclosure.

FIG. 3 is a schematic diagram showing one example of an apparatus for receiving a data packet for transmitting complex multimedia data according to an embodiment of the present disclosure.

Referring to FIG. 3, a receiving apparatus 300 includes a transceiver 305, a header detector 310, and a controller 315.

The transceiver 305 receives the MFU generated by one of predetermined header formats, which is selected according to the amount of multimedia organizing complex multimedia data. The header detector 310 confirms a header of the MFU. The controller 315 controls the transceiver 350 to receive the complex multimedia data packetized in the basic transmission unit, according to the identified header.

The header detector 310 confirms a start flag included in the header to confirm a start position of the MFU, confirms the MFU type field included in the header, and confirms a last flag included in the header to confirm whether the last flag indicates that the header includes an MFU type extension field. The header detector 310 combines the MFU type field and the MFU type extension field to confirm the multimedia data type included in the MFU if the last flag indicates that the header includes the MFU type extension field. The header detector 310 confirms the multimedia data type included in the MFU according to the MFU type field if the last flag does not indicate that the header includes the MFU type extension field.

The transmission data according to an embodiment of the present disclosure may be fragmented into a single payload or payloads corresponding to a base unit according to the transmission environment, and then transmitted as a plurality of payloads. The payloads may be respectively packetized into packets and then transmitted. Alternatively, the packets may be multiplexed and transmitted through a complex network channel.

Further, a predetermined unit of an interleaving function may be provided in consideration of a particular transmission function, and here, the payload can be defined to be considerably efficient and simple as a general unit structure which is possible in a transmission layer.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A transmitting apparatus, comprising:
   a transceiver; and
   a processor configured to control the transceiver to transmit a data packet including a packet header and a packet payload,
   wherein the packet payload includes a payload header and a fragment of a data unit or at least one complete data unit, and the payload header includes fragmentation information and a fragment indicator,
   wherein the fragmentation information includes information about a number of at least one packet payload including at least one fragment of the data unit succeeding the packet payload,
   wherein the fragment indicator includes one of a first value indicating that the packet payload includes a first fragment of the data unit, a second value indicating that the packet payload includes a fragment of the data unit that is neither the first fragment nor a last fragment of the data unit, and a third value indicating that the packet payload includes the last fragment of the data unit,
   wherein the packet header including a packet identifier, a sequence number, and a timestamp,
   wherein the packet identifier includes information to identify an asset related to the data packet,
   wherein the sequence number includes information to identify at least one data packet that has the packet identifier, and
   wherein the timestamp includes time information for the data packet.

2. The transmitting apparatus of claim 1, wherein the payload header includes type information indicating a data type of the fragment, and the data type includes a media fragment unit (MFU).

3. The transmitting apparatus of claim 1, wherein the payload header includes aggregation information indicating whether the at least one complete data unit is included in the packet payload.

* * * * *